United States Patent [19]

Stanevich

[11] Patent Number: 5,848,611
[45] Date of Patent: Dec. 15, 1998

[54] ROTARY VALVE

[75] Inventor: Kenneth W. Stanevich, De Kalb, Ill.

[73] Assignee: TRW inc., Lyndhurst, Ohio

[21] Appl. No.: 969,977

[22] Filed: Nov. 13, 1997

Related U.S. Application Data

[63] Continuation of Ser. No. 635,435, Apr. 18, 1996, abandoned.

[51] Int. Cl.$^6$ ................................................ F16K 11/085
[52] U.S. Cl. ............................... 137/625.47; 137/625.16; 137/353
[58] Field of Search .................. 137/625.46, 625.47, 137/625.15, 625.16, 580, 353

[56] References Cited

U.S. PATENT DOCUMENTS

| | | | |
|---|---|---|---|
| 3,090,396 | 5/1963 | Rudelick | 137/625.47 X |
| 3,129,644 | 4/1964 | Anderson | 137/625.47 X |
| 3,134,403 | 5/1964 | Rudelick | 137/625.47 X |
| 3,192,954 | 7/1965 | Gerhold et al. | 137/625.47 X |
| 3,659,515 | 5/1972 | Galaniuk . | |
| 3,788,599 | 1/1974 | Cloyd . | |
| 3,814,129 | 6/1974 | Cioffi . | |
| 4,049,020 | 9/1977 | Neveaux | 137/625.46 X |
| 5,129,859 | 7/1992 | Yagi . | |

*Primary Examiner*—John Fox
*Attorney, Agent, or Firm*—Tarolli, Sundheim, Covell, Tummino & Szabo

[57] ABSTRACT

A valve (10) for applying vacuum to selected ones of a plurality of vacuum-operated devices (B–F) in a vehicle includes a valve core (30) which is rotatable in a valve sleeve (20) between a plurality of predetermined rotational positions. A plurality of circumferentially spaced passages (60a–60f) extend axially in the valve sleeve (20). Each passage (60b–60f) has a first end portion (66b–66f) for connection with a respective one of the devices (B–F) and a second end portion (68a–68f) which is selectively connectable with the vacuum port (44a). A vacuum port (44a) on the valve sleeve (20) is connected with a vacuum source (V) in the vehicle. A control groove (82) on the outer periphery (80) of the valve core (30) is in fluid communication with the vacuum port (44a) when the valve core (30) is in the predetermined rotational positions. The control groove (82) is in fluid communication with predetermined ones of the second end portions (68a–68f) of the passages (60a–60f) when the valve core (30) is in the predetermined rotational positions.

9 Claims, 3 Drawing Sheets

ROTARY VALVE

This application is a continuation of application Ser. No. 08/635,435 filed on Apr. 18, 1996 now abandoned.

BACKGROUND OF THE INVENTION

1. Technical Field

The present invention relates to a control valve for applying vacuum from a vacuum source in a vehicle to selected ones of a plurality of vacuum-operated devices in the vehicle, such as components of a heating and air conditioning system of the vehicle.

2. Description of the Prior Art

A typical heating and air conditioning system of a vehicle includes a plurality of air outlets in and around the instrument panel of the vehicle. The flow of heated and/or conditioned air through the system is controlled by a control valve which controls operation of a number of vacuum-operated devices, such as flapper valves or other actuators, which are associated with ducts leading to the air outlets or with the devices themselves. The control valve is manually operable, by an occupant of the vehicle, to direct vacuum to selected ones of the vacuum-operated devices, thereby to control the flow of air through the system.

SUMMARY OF THE INVENTION

The present invention is a valve for connecting selected ones of a plurality of vacuum-operated devices in a vehicle with a source of vacuum in the vehicle. The valve comprises a valve sleeve having an inner peripheral surface centered on an axis of the valve and having an opening therein and a valve core disposed within the opening in the valve sleeve and having an outer peripheral surface disposed adjacent to the inner peripheral surface of the valve sleeve. A first one of the valve sleeve and the valve core includes a vacuum port for connection with the vacuum source and has a plurality of circumferentially spaced passages which extend axially in the first one of the valve sleeve and the valve core, each one of the passages having a first end portion for connection with a respective one of the plurality of devices and a second end portion which is selectively connectable with the vacuum port. A second one of the valve sleeve and the valve core includes a control groove having first and second portions. The second one of the valve sleeve and the valve core is rotatable about the axis between a plurality of predetermined rotational positions relative to the first one of the valve sleeve and the valve core. The first portion of the control groove is in fluid communication with the vacuum port when the second one of the valve sleeve and the valve core is in the predetermined rotational positions. The second portion of the control groove is in fluid communication with predetermined ones of the second end portions of the passages when the second one of the valve sleeve and the valve core is in at least one of the predetermined rotational positions.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
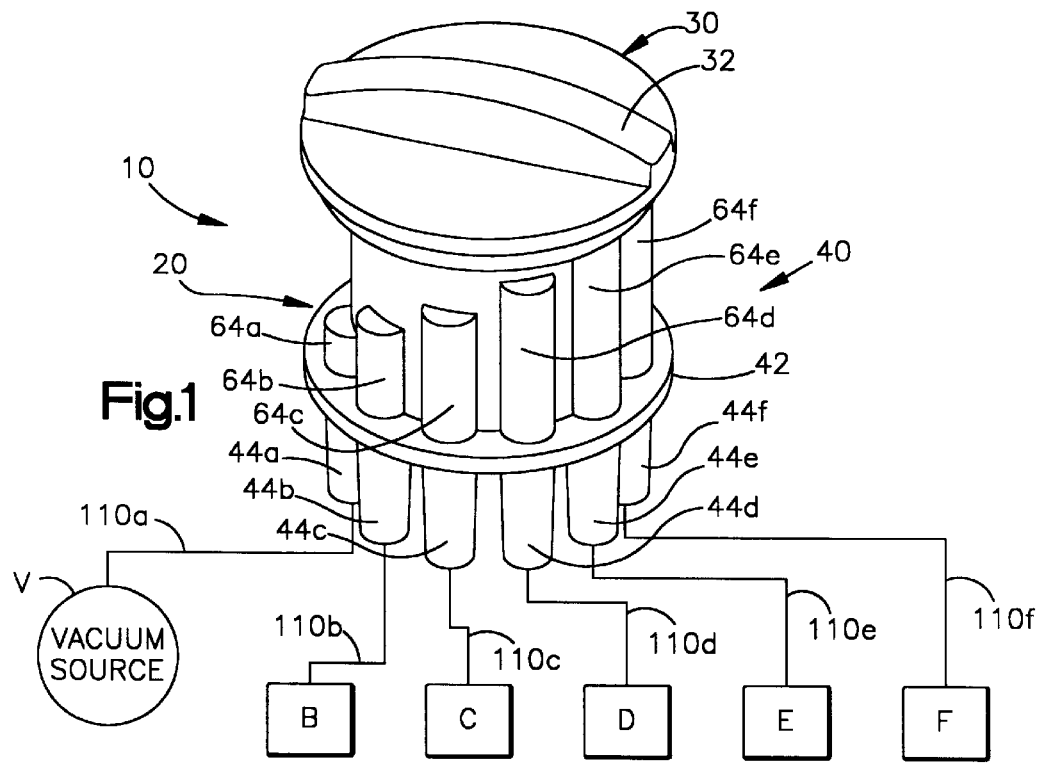
FIG. 1 is a schematic illustration of portions of a vehicle heating and air conditioning system including a valve which is constructed in accordance with the present invention.

The present invention relates to a control valve for applying vacuum from a vacuum source in a vehicle to selected ones of a plurality of vacuum-operated devices in the vehicle, such as components of a heating, ventilating, and air conditioning system of the vehicle. As representative of the present invention, FIG. 1 illustrates schematically a valve 10 for connecting selected ones of a plurality of vacuum-operated devices B–F in a vehicle with a vacuum source V in the vehicle. The valve 10 includes a valve sleeve 20, a valve core 30, and a handle 32 which is manually engageable by an occupant of the vehicle to move the valve core relative to the valve sleeve.

The valve sleeve 20 is preferably made from metal or from molded plastic. The valve sleeve 20 includes a main body portion 40, a radially extending mounting flange 42, and a plurality of ports 44a–44f of the valve 10. In the illustrated embodiment, the valve sleeve 20 includes six ports, one for connection with the vacuum source V and the other five for connection with the vacuum-operated devices B–F.

The main body portion 40 of the valve sleeve 20 has a generally cylindrical configuration including parallel, cylindrical inner and outer peripheral surfaces 46 and 48. The surfaces 46 and 48 are centered on a longitudinal central axis 50 of the valve 10. An annular, radially extending end surface 52 of the main body portion 40 of the valve sleeve 20 extends between the inner and outer peripheral surfaces 46 and 48. The inner peripheral surface 46 of the main body portion 40 defines a central opening 54 in the valve sleeve 20 for receiving the valve core 30.

A plurality of passages 60a–60f are formed in the valve sleeve 20. Each one of the passages 60a–60f includes a respective axially extending, cylindrical central portion 62a–62f which is formed in a respective one of a plurality of columns 64a–64f spaced circumferentially around the outer periphery of the valve sleeve 20.

A first end portion 66a–66f of each passage 60a–60f is located in a respective one of the ports 44a–44f. Each one of the ports 44a–44f is dimensioned so as to fit into the end of a known vacuum line such as the lines 110a and 110e, portions of which are shown schematically in FIG. 3. Each one of the ports 44a–44f is connectable with a respective one of the plurality of vacuum-operated devices B–F.

Each one of the passages 60a–60f has a respective second end portion 68a–68f which is disposed in the valve sleeve 20 at a location spaced apart axially from the first end portions 66a–66f. In the passage 60a, the second end portion 68a extends radially inward from the central portion 62a of the passage to the inner peripheral surface 46 of the valve sleeve 20. The second end portion 68a terminates in a circular opening 70a in the inner surface 46 of the valve sleeve 20. The opening 70a forms a part of the second end portion 68a of the passage 60a.

Similarly, in the other passages 60b–60f, the second end portions 68b–68f extend radially inward from the central portions 62b–62f of the passages to the inner peripheral surface 46 of the valve sleeve 20. The second end portions 68b–68f terminate in a plurality of circular openings 70b–70f in the inner surface 46 of the valve sleeve 20. The openings 70b–70f form part of the second end portions 68b–68f of the passages 60b–60f.

Figure 5:
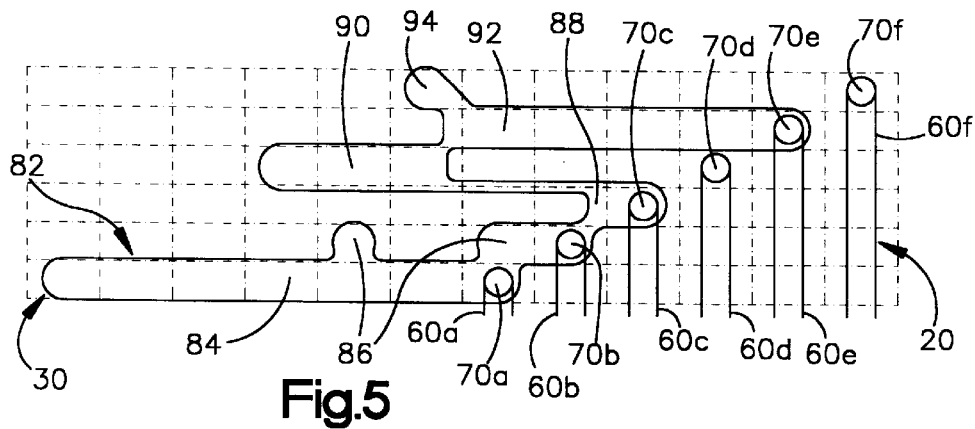
FIG. 5 is a schematic illustration showing the relative position of the valve core and the valve sleeve in a first rotational position.
Figure 6:
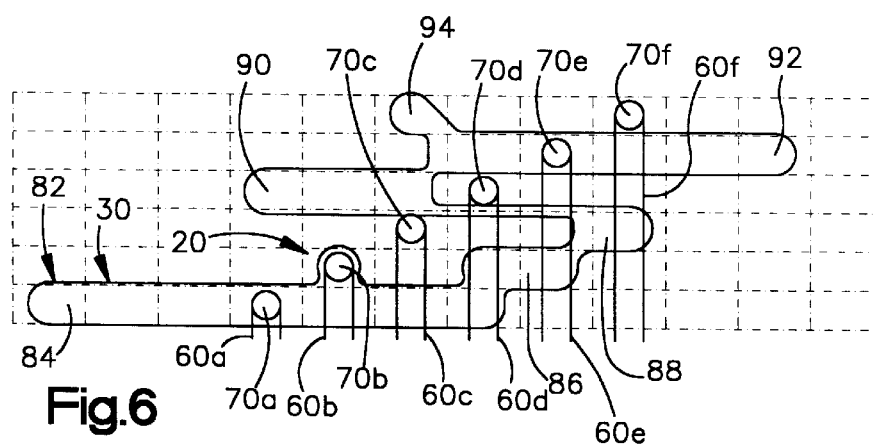
FIG. 6 is a schematic illustration similar to FIG. 5 showing the valve core and the valve sleeve in a second rotational position.
Figure 2:
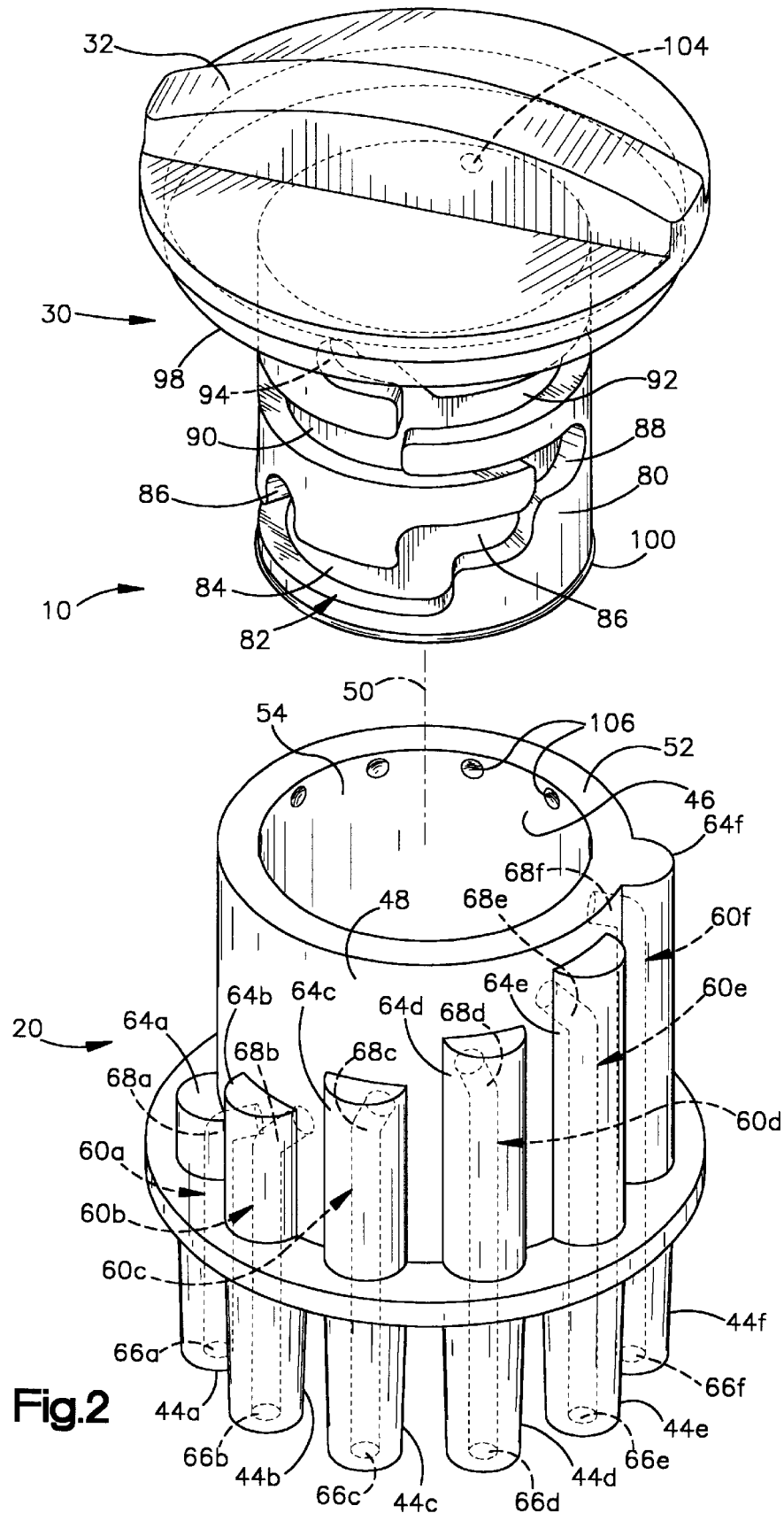
FIG. 2 is an exploded perspective view of the valve of FIG. 1 showing a valve core and a valve sleeve which form parts of the valve.

Each one of the central portions 62a–62f of the passages 60a–60f has a length which differs from the length of the other ones of the central portions of the passages. As a result, each one of the openings 70a–70f on the inner peripheral surface 46 of the valve sleeve 20 is spaced apart axially from the other ones of the openings. Also, the openings 70a–70f are spaced apart from each other circumferentially around the inner peripheral surface 46 of the valve sleeve 20. The pattern of openings 70a–70f thus has a helical configuration extending both axially and circumferentially around the inner peripheral surface 46 of the valve sleeve 20, as can be seen in FIG. 2. The pattern of openings 70a–70f is also illustrated in FIGS. 5 and 6, which show a planar projection of the cylindrical inner surface 46 of the valve sleeve 20, including the openings 70a–70f of the passages 60a–60f.

The valve core 30 is disposed within the central opening 54 in the valve sleeve 20. The valve core 30 is in the form of a hollow shaft which is fixed for rotation with the handle 32 about the axis 50. The handle 32 is manually engageable by an occupant of the vehicle to effect rotation of the valve core 30 relative to the valve sleeve 20.

The valve core 30 has an outer peripheral surface 80 which has a cylindrical configuration centered on the axis 50. The outer peripheral surface 80 of the valve core 30 is disposed adjacent to the inner peripheral surface 46 of the valve sleeve 20. Specifically, the outer peripheral surface 80 of the valve core 30 is located radially inward of, and in sliding engagement with, the inner peripheral surface 46 of the valve sleeve 20.

This relative positioning of the valve core 30 and the valve sleeve 20 creates a press fit engagement between the valve core and the valve sleeve. The material characteristics of the valve core 30 are selected so that the outer peripheral surface 80 of the valve core provides a seal between the openings 70a–70f in the valve sleeve 20—that is, blocks fluid communication between the openings. One suitable material is Santoprene (trademark) brand thermoplastic elastomer which is available from Monsanto Company of St. Louis, Mo. As a result of this seal, when vacuum is selectively applied to one of the openings 70a–70f, in a manner described below, the remaining ones of the openings 70a–70f are not connected with the vacuum source V through leakage or through fluid flow along the inner peripheral surface 46 of the valve sleeve 20.

A flange 98 on the valve core 30 engages the end surface 52 on the valve sleeve 20 to block axial movement of the valve core relative to the valve sleeve. A locking rib 100 on the valve core 30 engages in a locking groove 102 on the valve sleeve 20 to prevent removal of the valve core from the valve sleeve after assembly.

The valve core 30 has surfaces defining a control groove 82. The control groove 82 extends axially and circumferentially in a predetermined path along the outer peripheral surface 80 of the valve core 30. The control groove 82 has a plurality of segments 84, 86, 88, 90, 92 and 94. Each one of the segments 84–94 extends circumferentially around the valve core 30, but not axially, for a predetermined length or circumferential extent. Adjacent segments 84–94 of the control groove 82 are interconnected axially to place all the segments of the control groove in fluid communication with each other. Thus, the fluid pressure along the entire length of the control groove 82 is substantially the same at all times.

Each one of the segments 84–94 of the control groove 82 is disposed at a different predetermined axial location along the valve core 30 from the other ones of the segments, so as to be selectively registrable with a selected one of the openings 70a–70f in the valve sleeve 20. The pattern of the control groove 82 is also illustrated in FIGS. 5 and 6, which show a planar projection of the cylindrical outer surface 80 of the valve core 30, including the control groove, overlying the planar projection of the openings 70a–70f in the valve sleeve 20.

The first segment 84 of the control groove 82 on the valve core 30 is at the same axial location along the length of the valve 10 as the opening 70a of the first passage 60a. The second segment 86 of the control groove 82 on the valve core 30 is at the same axial location along the length of the valve 10 as the opening 70b of the second passage 60b.

The third segment 88 of the control groove 82 on the valve core 30 is at the same axial location along the length of the valve 10 as the opening 70a of the third passage 60c. The fourth segment 90 of the control groove 82 on the valve core 30 is at the same axial location along the length of the valve 10 as the opening 70d of the fourth passage 60d.

The fifth segment 92 of the control groove 82 on the valve core 30 is at the same axial location along the length of the valve 10 as the opening 70e of the fifth passage 60e. The sixth segment 94 of the control groove 82 on the valve core 30 is at the same axial location along the length of the valve 10 as the opening 70f of the sixth passage 60f.

When the valve 10 is mounted in the vehicle, the first port 44a on the valve sleeve 20 is connected with the vacuum source V via a vacuum line 110a. Vacuum from the vacuum source V is applied to the port 44a in the valve sleeve 20 and thus to the first passage 60a in the valve sleeve. The remaining ports 44b–44f on the valve sleeve 20 are connected with respective ones B–F of the vacuum-operated devices in the vehicle, via respective vacuum lines 110b–110f.

The valve core 30 is rotatable about the axis 50 between a plurality of predetermined rotational positions relative to the valve sleeve 20. An index member 104 on the valve core 30 is engageable in a series of index recesses 106 on the valve sleeve 20 to arrest movement of the valve core in the predetermined rotational positions.

The first segment 84 of the control groove 82, which forms a first portion of the control groove, has a sufficient circumferential length that it is in fluid communication with the opening 70a in the valve sleeve 20 when the valve core 30 is in any one of the plurality of the predetermined rotational positions. As a result, whenever vacuum from the vacuum source V is applied to the port 44a, vacuum is applied through the passage 60a to all the segments 84–94 of the control groove 82 on the valve core 30.

The remaining segments 86–94 of the control groove 82 on the valve core 30, which together form a second portion of the control groove, are selectively placed in fluid communication with predetermined ones of the openings 70b–70f of the passages 60b–60f on the valve sleeve 20, by selectively placing the valve core in the predetermined rotational positions. For example, FIGS. 5 and 6 illustrate schematically the relative positions of the control groove 82 and the openings 70a–70f when the valve core 30 is in two different predetermined rotational positions.

Figure 3:
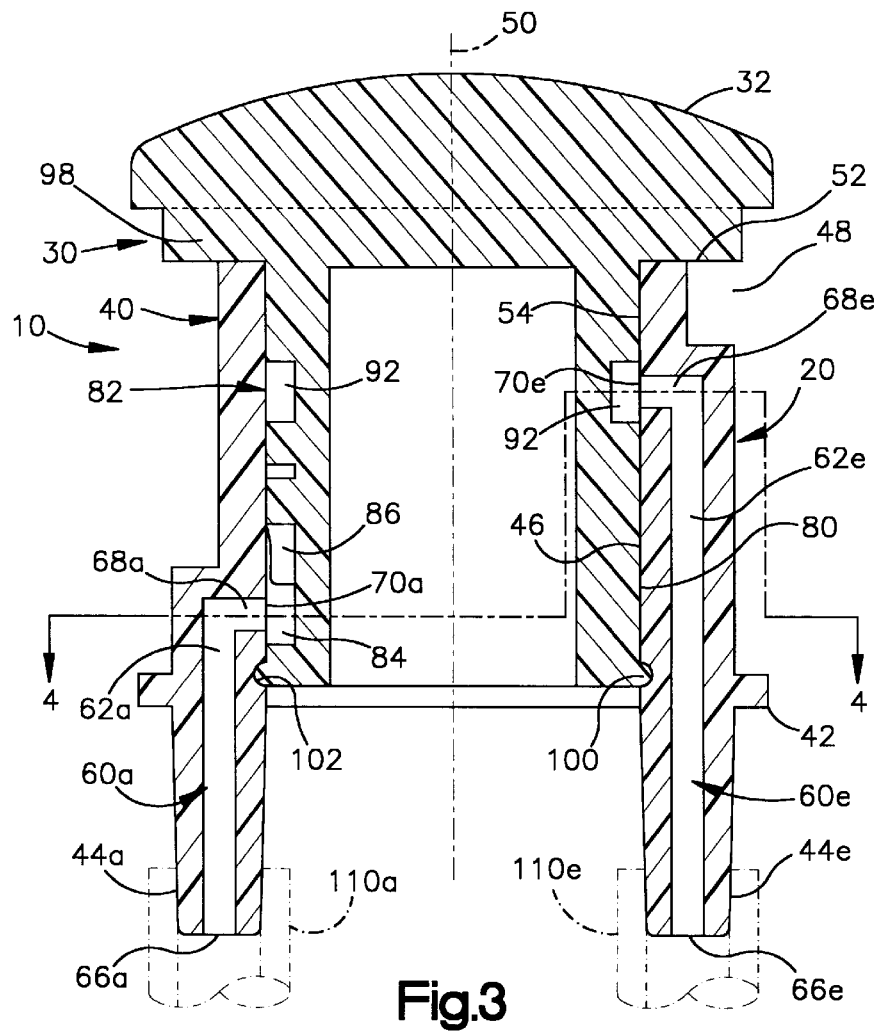
FIG. 3 is a sectional view of the valve of FIG. 1.
Figure 4:
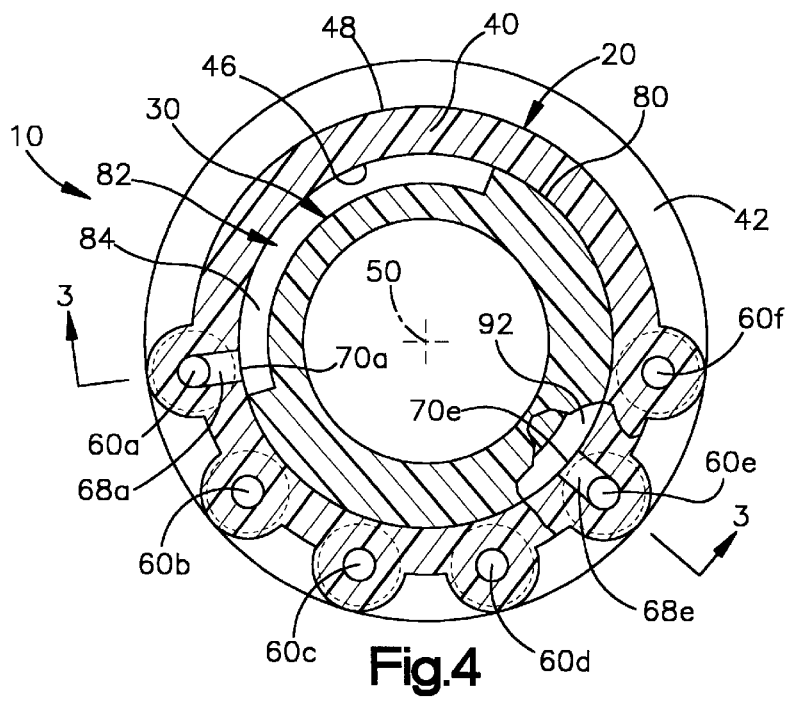
FIG. 4 is a sectional view taken generally along line 4—4 of FIG. 3.

When the valve core 30 is in the predetermined rotational position shown in FIG. 5, the first segment 84 of the control groove 82 is registered with the vacuum opening 70a on the valve sleeve 20. The fifth segment 92 of the control groove 82 is registered with the opening 70e of the passage 60e of the valve sleeve 20. (This position of the valve core 30 is also shown in FIGS. 3 and 4.) Vacuum is applied to the opening 70e of the passage 60e. As a result, vacuum is applied through the port 44e and through the vacuum line 110e to the device E.

The second segment 86 of the control groove 82 is registered with the opening 70b of the passage 60b of the valve sleeve 20. Vacuum is applied to the opening 70b of the passage 60b. Also, the third segment 88 of the control groove 82 is registered with the opening 70c of the passage 60c of the valve sleeve 20. Vacuum is applied to the opening 70c of the passage 60c. As a result, vacuum is applied through the ports 44b and 44c to the devices B and C.

When the valve core 30 is in the predetermined rotational position shown in FIG. 5, the fourth segment 90 of the control groove 82 is not registered with the opening 70d of the passage 60d of the valve sleeve 20. The sixth segment 94 of the control groove 82 is not registered with the opening 70f of the passage 60f of the valve sleeve 20. As a result, vacuum is not applied to the ports 44d and 44f and is not applied to the devices D and F.

When the handle 32 is manually operated so that the valve core 30 is rotated from the position shown in FIG. 5 to the position shown in FIG. 6, the first segment 84 of the control groove 82 remains in registration with the vacuum opening 70a on the valve sleeve 20. The second segment 86 of the control groove 82 remains in registration with the opening 70b of the passage 60b of the valve sleeve 20. Vacuum is applied to the opening 70b of the passage 60b. As a result, vacuum continues to be applied through the port 44b to the device B.

Also, the fifth segment 92 of the control groove 82 remains in registration with the opening 70e of the passage 60e of the valve sleeve 20. Vacuum is applied to the opening 70e of the passage 60e. As a result, vacuum continues to be applied through the port 44e to the device E.

When the valve core 30 is in the predetermined rotational position shown in FIG. 6, the third segment 88 of the control groove 82 no longer registers with the opening 70c of the passage 60c of the valve sleeve 20. Vacuum is, therefore, not applied to the opening 70c of the passage 60c. As a result, vacuum is not applied to the device C. Similarly, the fourth segment 90 and the sixth segment 94 of the control groove 82 do not register with the openings 70d and 70f in the valve sleeve 20. As a result, vacuum is not applied to the devices D and F.

From the above description of the invention, those skilled in the art will perceive improvements, changes and modifications in the invention. For example, the valve 10 could be used to control devices which are operated by the flow of air under pressure rather than by vacuum. As another example, the valve sleeve could have an inner peripheral surface which is made from a resilient material so as to seal against the valve core. Alternatively, a separate seal member could be incorporated between the valve core and the valve sleeve, in which case both the valve core and the valve sleeve could be made from a different, non-sealing material. As yet another example, the openings of the passages in the valve could be formed on the exterior of an inner valve member, with the valve core being replaced by an annular outer valve member which encircles the inner valve member. The control groove, in this case, would be formed on the inner periphery of the outer valve member so as to be registrable with the external openings in the inner valve member. Such improvements, changes and modifications within the skill of the art are intended to be covered by the appended claims.

Having described the invention, I claim:

1. Apparatus comprising:

a vacuum source;

a plurality of vacuum-operated devices in a vehicle;

a valve for connecting selected ones of said plurality of vacuum-operated devices with said vacuum source;

said valve including a valve sleeve having a cylindrical inner peripheral surface centered on an axis of said valve and having an opening therein;

said valve including a valve core disposed within said opening in said valve sleeve and having a cylindrical outer peripheral surface disposed in sealing engagement with said cylindrical inner peripheral surface of said valve sleeve;

said valve sleeve including a plurality of circumferentially spaced passages which extend axially in said valve sleeve from a single axial location along said valve sleeve to a plurality of different axial locations along said valve sleeve, said plurality of passages being disposed in a circular array centered on said axis, each one of said passages extending parallel to said axis;

each one of said passages having a respective first end portion at said single axial location which is connected in fluid communication with a respective one of said plurality of devices;

said valve sleeve also including a vacuum port for connection with said vacuum source, each one of said passages in said valve sleeve having a second end portion which is selectively connectable by said valve core with said vacuum port;

said valve core including a single continuous control groove extending around said outer peripheral surface of said valve core, all portions of said control groove being at substantially the same pressure, said control groove having first and second portions;

said valve core being rotatable about said axis between a plurality of predetermined rotational positions relative to said valve sleeve;

said first portion of said control groove being in fluid communication with said vacuum port when said valve core is in each one of said predetermined rotational positions;

said second portion of said control groove being in fluid communication with predetermined ones of said second end portions of said passages when said valve core is in at least one of said predetermined rotational positions;

said valve also including means for blocking axial movement of said valve core relative to said valve sleeve when said valve core is in any one of said predetermined rotational positions and when said valve core is being rotated between any of said predetermined rotational positions;

said apparatus further comprising a control member fixed for rotation with said valve core about said axis and manually engageable by an occupant of the vehicle to effect rotation of said valve core relative to said valve sleeve.

2. A valve as set forth in claim 1 wherein said valve sleeve includes said vacuum port and said passages, said valve core including said surfaces defining said control groove.

3. A valve as set forth in claim 2 wherein said second end portions of said passages comprise openings in said inner peripheral surface of said valve sleeve, said control groove being formed on said outer peripheral surface of said valve core, said openings being registrable with said second portion of said control groove when said valve core is in said predetermined rotational positions.

4. A valve as set forth in claim 1 wherein each one of said second end portions of said passages is spaced apart axially from the other ones of said second end portions of said passages.

5. A valve as set forth in claim 1 wherein said second one of said valve sleeve and said valve core is made from a material which provides a seal between said first and second ones of said valve sleeve and said valve core.

6. A valve as set forth in claim 1 wherein said control groove includes a plurality of circumferentially extending segments which are disposed at predetermined axial positions along said second one of said valve sleeve and said valve core.

7. A valve as set forth in claim 6 wherein each one of said second end portions of said passages is spaced apart axially from the other ones of said second end portions of said passages, each one of said second end portions being registrable with a selected one of said segments of said control groove.

8. A valve for connecting selected ones of a plurality of vacuum-operated devices in a vehicle with a source of vacuum in the vehicle, said valve comprising:

a valve sleeve having a cylindrical inner peripheral surface which is centered on an axis of said valve and which defines an opening in said valve sleeve; and a valve core which is disposed within said opening in said valve sleeve and which has a cylindrical outer peripheral surface disposed adjacent to said inner peripheral surface of said valve sleeve, said valve core being rotatable about said axis between a plurality of predetermined rotational positions relative to said valve sleeve;

said valve sleeve having a vacuum port for connection with the vacuum source and having surfaces defining a plurality of circumferentially spaced passages which extend axially in said valve sleeve, each one of said passages having a first end portion for connection with a respective one of the plurality of devices and a second end portion spaced axially apart from said first end portion and which is selectively connectable with said vacuum port on said valve sleeve;

said valve core having a control groove having first and second portions connected in fluid communication with each other;

said first portion of said control groove being in fluid communication with said vacuum port on said valve sleeve when said valve core is in said predetermined rotational positions;

said second portion of said control groove being in fluid communication with predetermined ones of said second end portions of said passages on said valve sleeve when said valve core is in said predetermined rotational positions; and a control member fixed for rotation with said valve core about said axis and manually engageable by an occupant of the vehicle to effect rotation of said valve core relative to said valve sleeve;

wherein said second end portions of said passages comprise openings in said inner peripheral surface of said valve sleeve, said control groove being formed on said outer peripheral surface of said valve core, said openings being registrable with said second portion of said control groove when said valve core is in said predetermined rotational positions.

9. A valve as set forth in claim 8 wherein each one of said second end portions of said passages is spaced apart axially from the other ones of said second end portions of said passages.

* * * * *